(12) United States Patent
Decurninge et al.

(10) Patent No.: US 10,998,987 B2
(45) Date of Patent: May 4, 2021

(54) DETERMINATION OF HARDWARE IMPAIRMENT PARAMETERS FOR DOWNLINK CHANNEL STATE INFORMATION ESTIMATION

(71) Applicant: Huawei Technologies Co., Ltd., Shenzhen (CN)

(72) Inventors: Alexis Decurninge, Boulogne Billancourt (FR); Maxime Guillaud, Boulogne Billancourt (FR); Xiwen Jiang, Biot Sophia Antipolis (FR); Florian Kaltenberger, Biot Sophia Antipolis (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/571,967

(22) Filed: Sep. 16, 2019

(65) Prior Publication Data
US 2020/0014473 A1 Jan. 9, 2020

Related U.S. Application Data

(63) Continuation of application No. PCT/EP2017/056303, filed on Mar. 16, 2017.

(51) Int. Cl.
*H04B 17/21* (2015.01)
*H04B 17/12* (2015.01)
*H04B 1/38* (2015.01)
*H04B 7/0456* (2017.01)
*H04B 7/06* (2006.01)

(52) U.S. Cl.
CPC ............... *H04B 17/21* (2015.01); *H04B 1/38* (2013.01); *H04B 7/0456* (2013.01); *H04B 7/0626* (2013.01); *H04B 17/12* (2015.01)

(58) Field of Classification Search
CPC ........ H04B 17/12; H04B 17/21; H04B 17/14; H04B 7/0413; H04B 7/0456; H04B 7/06;
(Continued)

(56) References Cited

U.S. PATENT DOCUMENTS 10,020,596 B2 * 7/2018 Benjebbour ............. H04B 7/10
2010/0150013 A1 6/2010 Nara et al.
(Continued)

FOREIGN PATENT DOCUMENTS

CN 104025526 A 9/2014
CN 105049383 A 11/2015
(Continued)

OTHER PUBLICATIONS

Shepard, Clayton et al., "Argos: Practical Many-Antenna Base Stations", in Proc. ACM Int. Conf. Mobile Computing and Networking (MobiCom), Aug. 2012, 12 pages.
(Continued)

*Primary Examiner* — Betsy Deppe
(74) *Attorney, Agent, or Firm* — Slater Matsil, LLP

(57) ABSTRACT

Intra-array pilot measurements are performed with an antenna array of a MIMO transceiver. The antenna array comprises N transceive antennas. The antenna array is partitioned into K groups of antennas, $G_k$, k=1, . . . , K, wherein K≥2, each group $G_k$ comprising $N_k$ antennas, $A_{ki}$, i=1, . . . , $N_k$, of the antenna array. For each k=1, . . . , K, $S_k$ pilot measurements, $M_{ks}$, s=1, . . . , $S_k$, are performed, wherein $S_k$≥1 and wherein each pilot measurement $M_{ks}$ comprises transmitting simultaneously by each antenna $A_{ki}$, i=1, . . . , $N_k$, of the group $G_k$ a pilot signal $P_{kis}$ and generating by each antenna $A_{k'i'}$, i'=1, . . . , $N_{k'}$, of the other groups, $G_{k'}$, k'≠k, a received signal $Y_{kk'i's}$ by receiving the pilot signals $P_{kis}$ transmitted by the antennas $A_{ki}$, i=1, . . . , $N_k$. The measurements can be performed in a mode for
(Continued)

detecting whether current hardware impairment parameters are valid or in a mode for updating the hardware impairment parameters.

16 Claims, 7 Drawing Sheets

(58) Field of Classification Search
CPC ...... H04B 7/0617; H04B 7/0626; H04B 1/38; H04B 1/40; H01Q 1/246
See application file for complete search history.

(56) References Cited

U.S. PATENT DOCUMENTS

| | | |
|---|---|---|
| 2010/0321233 A1 | 12/2010 | Ben-Zur et al. |
| 2013/0032299 A1 | 2/2013 | Bratcher et al. |
| 2014/0211779 A1 | 7/2014 | Caire et al. |
| 2016/0142094 A1 | 5/2016 | Papadopoulos |

FOREIGN PATENT DOCUMENTS

| | | | | |
|---|---|---|---|---|
| EP | 2448137 A1 | 5/2012 | | |
| WO | 2014032271 A1 | 3/2014 | | |
| WO | WO-2016175144 A1 | * | 11/2016 | ........... H04B 7/0617 |
| WO | WO-2016176626 A1 | * | 11/2016 | ............. H04B 17/14 |

OTHER PUBLICATIONS

Papadopoulos, Haralabos et al, "Avalanche: Fast RF calibration of Massive Arrays", in 2014 IEEE Global Conference on Signal and Information Processing (GlobalSIP), Dec. 3-5, 2014, pp. 607-611.

* cited by examiner

Same electromagnetic channel

DETERMINATION OF HARDWARE IMPAIRMENT PARAMETERS FOR DOWNLINK CHANNEL STATE INFORMATION ESTIMATION

CROSS-REFERENCE TO RELATED APPLICATIONS

This application is a continuation of International Application No. PCT/EP2017/056303, filed on Mar. 16, 2017, the disclosure of which is hereby incorporated by reference in its entirety.

TECHNICAL FIELD

The invention relates to the field of wireless communication, in particular to the field of wireless communication using a multi-antenna transceiver.

BACKGROUND

An antenna array is an antenna setup that comprises two or more antennas.

Compared to a single antenna, an antenna array allows for more effective transmissions as well as reception of a radio frequency (RF) signal.

With a transmit array comprising Nt transmit antennas and a receive array comprising Nr receive antennas, there are $N_t \times N_r$ propagation paths, each of these propagation paths going from one of transmit antennas to one of the receive antennas. Each of the propagation paths involves a gain and a phase shift, for a given frequency component of the transmitted signal. The gain and the phase shift can be expressed as a complex gain factor. The $N_t \times N_r$ complex gain factors thus associated with the $N_t \times N_r$ propagation paths constitute the elements of the channel matrix H, of size $N_t \times N_r$.

Channel state information (CSI) is information about the channel matrix H and it may refer to the channel matrix H itself. CSI at the transmitter side is crucial for exploiting the potential of Multiple-In-Multiple-Out (MIMO) systems, in particular in multi-user scenarios. In Time Division Duplexing (TDD) mode, the downlink (DL) transmission from a base station (BS) to a user equipment (UE) and the uplink (UL) transmission from the UE to the BS take place on the same frequency band (see FIG. 1).

Downlink CSI in TDD mode can be acquired by exploiting reciprocity between the DL transmission and the UL transmission. However, hardware impairments of the antenna array at the base station break the reciprocity, and they need to be taken into account for determining the downlink CSI.

FIG. 2 shows a schematic model of an uplink channel and a downlink channel in TDD mode. In the model illustrated in FIG. 2, the base station and the user equipment each comprise a MIMO transceiver. The MIMO transceiver comprises a receiver chain and a transmitter chain. In each subcarrier, the hardware impairments can be modeled as linear filters, schematically shown as blocks TBS, RBS, TUE, and RUE. TBS and RBS represent impairment at the transmitter chain and at the receiver chain, respectively, at the base station.

TUE and RUE represent impairment at the transmitter chain and at the receiver chain, respectively, at the user equipment. HDL and HUE represent the effective channel of the downlink channel and the uplink channel, respectively. CDL and CUE represent the channel matrix associated with the "over-the-air" section, i.e. the electromagnetic (EM) section, of the downlink channel and the uplink channel, respectively.

The effective downlink and uplink channel matrices are related to the "over-the-air" channel matrix as:

$$H_{DL} = R_{UE} C T_{BS}$$

$$H_{UL} = R_{BS} C^T T_{UE}.$$

The effective downlink channel matrix is therefore:

$$H_{DL} = R_{UE} T_{UE}^{-T} H_{UL}^T R_{BS}^{-T} T_{BS},$$

that is, $$H_{DL} = F_{UE} H_{UL}^T R_{BS}^{-T},$$

where $F_{BS} = F_{BS} T_{BS}^{-T}$ is a BS calibration matrix and $F_{UE} R_{UE} T_{UE}^{-T}$ a UE calibration matrix. The BS calibration matrix may be denoted F for the sake of simplicity (that is, $F = F_{BS}$).

Downlink CSI can be acquired as follows. The UE sends pilots to the BS. The BS receives the pilots from the UE. Based on the received pilots, the BS estimates the uplink channel state information HUE (using, for example, one of the state-of-the art estimation methods, such as least-squares estimation). Based on the estimated uplink channel state information HUE, the BS deduces the downlink channel state information HDL coupled with the user calibrations matrix $F_{UE}$ through:

$$F_{UE}^{-1} H_{DL} = H_{UL}^T F_{BS}^{-T}.$$

In many applications (for example, some beamforming applications), only the product $F_{UE}^{-1} H_{DL}$ (but not the channel matrix $H_{DL}$ itself) needs to be known.

Each subcarrier has its own N×N calibration matrix F, where N is the number of antennas in the antenna array of the base station. The calibration matrix F therefore needs to be estimated for each subcarrier of interest.

The calibration matrix F generally remains stable over time. Two types of variations are nevertheless quite common: firstly, smooth variations and, secondly, sporadic sudden variations. Smooth variations occur typically over several minutes, e.g., due to temperature changes. Sporadic sudden variations may be caused by power surges, power ruptures, or loss of synchronization.

Hardware impairment of an antenna array can be measured by sending signals over the air between antennas of the antenna array. Several schemes are known.

Shepard et al, "Argos: Practical Many-Antenna Base Stations" in Proc. ACM Int. Conf. Mobile Computing and Networking (MobiCom), August 2012, propose a method in which one reference antenna is chosen among the antennas of the base station. In a first step, the reference antenna sends a signal to the other antennas. In a second step, each antenna that is not the reference antenna sends a signal in one time slot each. Calibration coefficients are then estimated according to the received signals.

US 2014/211779 A1 (Caire et al) discloses a method ("Rogalin's method") in which bi-directional measurements are performed for each pair of antennas. A first antenna of the pair sends a signal while the second antenna listens. Then the second antenna sends a signal while the first one listens. Calibration coefficients are then determined based on the received signals.

Papadopoulos et al, "Avalanche: Fast RF calibration of massive arrays", in 2014 IEEE Global Conference on Signal and Information Processing (GlobalSIP), propose using a subgroup of calibrated antennas in order to calibrate the other antennas. First, a pair of antennas is calibrated according to a bi-directional measurement for the pair. Then, a group of two further antennas sends a signal to the pair of antennas already calibrated and their calibration coefficients are estimated according to past measurements. This process is repeated with a group of further antennas with the same size as the group of antennas already calibrated.

All of these techniques involve an exchange of pilot signals between antennas of the array.

The above considerations make reference to a MIMO transceiver in a base station for communicating with a user equipment. They do, however, apply similarly to any type of MIMO transceiver and are not limited to a MIMO transceiver in a base station. Insofar they are illustrative rather than limiting.

SUMMARY

Embodiments of the invention provide an efficient concept for evaluating or estimating a calibration matrix of a MIMO transceiver. This object is achieved by the features of the independent claims. Further embodiments of the invention are apparent from the dependent claims, the description, and the figures.

The above mentioned existing techniques are not well suitable for rapidly updating the calibration matrix, e.g., in the event of a sudden variation of hardware impairment. Re-calibration using those techniques tends to be expensive in terms of the required spectral resources and is usually done periodically rather than when it is actually needed.

Further, off-diagonal elements of the calibration matrix are often negligible and that it may be sufficient to approximate the calibration matrix by a diagonal or block-diagonal matrix.

According to a first aspect, embodiments relate to a MIMO transceiver comprising an antenna array, a transceiver unit connected to the antenna array, and a control unit connected to the transceiver unit. The antenna array comprises N transceive antennas. The control unit is configured to perform intra-array pilot measurements by: partitioning the antenna array into K groups of antennas, $G_k$, $k=1, \ldots, K$, wherein $K \geq 2$, each group $G_k$ comprising $N_k$ antennas, $A_{ki}$, $i=1, \ldots, N_k$, of the antenna array; and for each $k=1, \ldots, K$, controlling the transceiver unit to perform $S_k$ pilot measurements, $M_{ks}$, $s=1, \ldots, S_k$, wherein $S_k \geq 1$ and wherein each pilot measurement $M_{ks}$ comprises transmitting simultaneously by each antenna $A_{ki}$, $i=1, \ldots, N_k$, of the group $G_k$ a pilot signal $P_{kis}$ and generating by each antenna $A_{k'i'}$, $i'=1, \ldots, N_{k'}$, of the other groups, $G_{k'}$, $k' \neq k$, a received signal $Y_{kk'i's}$ by receiving the pilot signals $P_{kis}$ transmitted by the antennas $A_{ki}$, $i=1, \ldots, N_k$.

Thus, an efficient technique for conducting intra-array pilot measurements is provided. The measured data (i.e. the received pilot signals) can be used for different purposes. One purpose is to check whether an available value of the calibration matrix $F_{BS}$ is up to date (i.e. for testing the calibration matrix $F_{BS}$). Another purpose is to determine a new value of the calibration matrix $F_{BS}$ (i.e. for updating the calibration matrix $F_{BS}$). The technique is particularly suitable for detecting sudden variations of the calibration matrix, and for correcting them. The technique may be particularly useful when the antenna array comprises four or more antennas.

At least one of the groups may comprise two or more antennas. In other words, there may be at least one k with $N_k \geq 1$. In this case, bidirectional measurements are not performed for every antenna pair. This total time needed for the measurements is thus reduced.

In one embodiment, the control unit is configured to evaluate calibration of the antenna array (e.g., in a first mode, herein referred to as a normal mode) or configured to calibrate (e.g., in a second mode, herein referred to as an urgent mode) the antenna array, based on a plurality of the received signals $Y_{kk'i's}$, wherein $k=1$, $s=1, \ldots, S_k$, $k' \neq k$, and $i'=1, \ldots, N_{k'}$. "Evaluating calibration of the antenna array" means determining whether the antenna array is sufficiently well calibrated, i.e. whether the calibration matrix F is sufficiently accurate.

More specifically, the control unit may be configured to calibrate the antenna array by determining a calibration matrix F of size N×N so as to minimize or reduce an extent to which a set of reciprocity relations is violated, or wherein the control unit is configured to evaluate calibration of the antenna array by computing an extent to which the set of reciprocity relations is violated, wherein each of the reciprocity relations is a reciprocity relation between the received signals generated by one of the groups of antennas and the received signals generated by another one of the groups of antennas. The calibration matrix can be taken diagonal or block-diagonal, in this case it may be represented by its diagonal elements or by its on-diagonal blocks, respectively.

The reciprocity relations may be:

$$\Sigma_{i=1}^{N_k}\Sigma_{i'=1}^{N_k}P_{kis}(F_k^{-1})_{ii'}Y_{kk'i's}=\Sigma_{i=1}^{N_{k'}}\Sigma_{i'=1}^{N_{k'}}Y_{k'ki's}(F_{k'}^{-1})_{ii'}P_{k'is'}$$

wherein $k' \neq k$ and $s=1, \ldots, S_k$, and $s'=1, \ldots, S_{k'}$, and wherein $F_k$ is a calibration matrix of size $N_k \times N_k$ for the k-th group of antennas $G_k$, wherein $F_k$ is a sub matrix of the calibration matrix F associated with the k-th group of antennas $G_k$. If the antennas are ordered so that antennas of the group $G_k$ are grouped together, $F_k$ will be a block of size $N_k \times N_k$ on the diagonal of the calibration matrix F.

The measurements with $s=1, S_k$ and $s'=1, S_{k'}$ may be coherent measurements. This means that they are done within a time interval that is sufficiently short for variations of the channel matrix to be negligible. In this case it can be expected that the reciprocity relations are satisfied with a negligible error. Alternatively, the $S_k$ and $S_{k'}$ pilot measurements may be decomposed into $T_{NC}$ groups of $L_k$ and $L_{k'}$ coherent measurements respectively (so that $S_k = L_k T_{NC}$). In this case the reciprocity relations given above apply for each coherent slot, that is to say for $s=tL_k+1, \ldots, tL_k+L_k$ and $s'=tL_{k'}+1, \ldots, tL_{k'}+L_{k'}$, and $1 \leq t \leq T_{NC}$.

In one embodiment, the control unit is configured to calibrate the antenna array by: determining a decalibrated pool of antennas, which is a subset of the antennas of the antenna array; and calibrating the decalibrated pool of antennas. The antenna array can thus be calibrated particularly rapidly.

The control unit may be configured to determine the decalibrated pool of antennas by determining for each $k=1, \ldots, K$ whether group $G_k$ is calibrated, and if the group $G_k$ is found to be calibrated, excluding the antennas of group $G_k$ from the decalibrated pool of antennas.

The decalibrated pool antennas can thus be determined efficiently. A group $G_k$ of antennas may be considered calibrated if the calibration matrix $F_k$ associated with that group is known to a sufficient degree of accuracy. In an initial phase of the calibration procedure, the decalibrated pool of antennas comprises all antennas of the antenna array. Excluding calibrated groups of antennas from the decalibrated pool of antennas then reduces the number of antennas in the decalibrated pool of antennas. Further evaluation or calibration does not need to involve the whole antenna array—the further evaluation or calibration can be restricted to the decalibrated pool of antennas and can therefore be faster.

For determining whether group $G_k$ is calibrated, the control unit may be configured as described above, now considering the group $G_k$ as the antenna array. In other words, the control unit may be configured for the group $G_k$ as described above for the full antenna array. Group $G_k$ can thus be calibrated efficiently.

For calibrating the decalibrated pool of antennas, the control unit may be configured as described above, now considering the decalibrated pool of antennas as the antenna array. In other words, it is proposed to apply the technical measures described for the whole antenna array to the decalibrated pool of antennas. These technical measures, when applied to the decalibrated pool of antennas, have technical effects and advantages analogous to those described above with reference to the whole antenna array.

In one embodiment, the control unit may be configured to determine the decalibrated pool of antennas iteratively. In this embodiment, the above described operations of partitioning the antenna array into K groups $G_k$ and "determining for each $k=1, \ldots, K$ whether group $G_k$ is calibrated, and if the group $G_k$ is found to be calibrated, excluding the antennas of group $G_k$ from the decalibrated pool of antennas" are the first iteration. In a second iteration, operations similar those of the first iteration are applied to each of the groups that were identified as decalibrated in the first iteration, to determine smaller groups of decalibrated antennas. Further iterations may be performed similarly, until every decalibrated group of the antenna array has been partitioned into calibrated and can thus be successively partitioned into ever smaller groups of antennas until every decalibrated group consists of a single antenna. For example, for the second iteration, the control unit may be configured for each $k=1, \ldots, K$ to further partition the group $G_k$ into two or more subgroups if the group $G_k$ is found to be decalibrated and to evaluate calibration of each of these subgroups; and to exclude the antennas of any one of the subgroups that are found to be calibrated from the decalibrated pool of antennas. The decalibrated pool of antennas can thus be reduced further, allowing for an even faster further evaluation or calibration (i.e. for a faster testing or estimation of the calibration matrix associated with the decalibrated pool of antennas).

In one embodiment, K=2. I.e. the antenna array is partitioned into two groups, $G_x$ and $G_2$. A particularly fast procedure for calibrating or testing calibration can thus be implemented.

In one embodiment, the control unit is configured to evaluate calibration of the antenna array based on a plurality of the received signals $Y_{kk'i's}$, wherein $k=1, \ldots, K$, $s=1, \ldots, S_k$, $k' \neq k$, and $i'=1, \ldots, N_{k'}$, and if the antenna array is found to be decalibrated, to calibrate the antenna array using a method of any one of the preceding claims. Evaluating calibration and calibrating the antenna array depending on whether the antenna array is found to be decalibrated can be more efficient than, for example, periodic calibration of the antenna array.

The control unit may be configured to compute downlink channel state information on the basis of an uplink channel matrix $H_{UL}$ and the calibration matrix F. For example, the control unit may be configured to compute downlink channel state information by computing the product $H_{UL}^T F^{-T}$.

In accordance with a second aspect, a method of performing intra-array pilot measurements for an antenna array of a MIMO transceiver is provided. The antenna array comprises N transceive antennas, the method comprising: partitioning the antenna array into K groups of antennas, $G_k$, $k=1, \ldots, K$, wherein $K \geq 2$, each group $G_k$ comprising $N_k$ antennas, $A_{ki}$, $i=1, \ldots, N_k$, of the antenna array; for each $k=1, \ldots, K$ performing $S_k$ pilot measurements, $M_{ks}$, $s=1, \ldots, S_k$, wherein $S_k \geq 1$ and wherein each pilot measurement $M_{ks}$ comprises transmitting simultaneously by each antenna $A_{ki}$, $i=1, \ldots, N_k$, of the group $G_k$ a pilot signal $P_{kis}$ and generating by each antenna $A_{k'i'}$, $i'=1, \ldots, N_{k'}$, of the other groups, $G_{k'}$, $k' \neq k$, a received signal $Y_{kk'i's}$ by receiving the pilot signals $P_{kis}$ transmitted by the antennas $A_{ki}$, $i=1, \ldots, N_k$.

At least one of the groups may comprise two or more antennas. In other words, there is at least one k with $N_k \geq 1$. It is understood that no pilots need to be exchanged within a given group. This can make the method more rapid compared to techniques in which pilots are exchanged between the antennas of every pair of antennas of the array.

The method may comprise evaluating calibration of the antenna array (e.g., in a normal mode) or calibrating (e.g., in an urgent mode) the antenna array, based on a plurality of the received signals $Y_{kk'i's}$, wherein $k=1$, $s=1, \ldots, S_k$, $k' \neq k$, and $i'=1, \ldots, N_{k'}$. Evaluating calibration of the antenna array means determining whether the antenna array is calibrated, i.e. whether the calibration matrix F is accurate, or determining a degree of accuracy of the calibration matrix F.

In one embodiment, calibrating the antenna array comprises determining a calibration matrix F of size N×N so as to minimize or reduce an extent to which a set of reciprocity relations is violated, or wherein said evaluating calibration of the antenna array comprises computing an extent to which the set of reciprocity relations is violated with the calibration matrix F, wherein each of the reciprocity relations is a reciprocity relation between the received signals generated by one of the groups of antennas and the received signals generated by another one of the groups of antennas. The calibration matrix can be diagonal or block-diagonal, in this case it can be represented by its diagonal elements or on-diagonal blocks.

The reciprocity relations may be:

$$\sum_{i=1}^{N_k} \sum_{i'=1}^{N_{k'}} P_{kis}(F_k^{-1})_{ii} Y_{kk'i's'} = \sum_{i=1}^{N_k} \sum_{i'=1}^{N_{k'}} Y_{k'ki's} (F_{k'}^{-1})_{ii'} P_{k'i's'}$$

wherein $k' \neq k$ and $s=1, \ldots, S_k$, and $s=1, \ldots, S_{k'}$ and wherein $F_k$ is a calibration matrix of size $N_k \times N_k$ for the k-th group of antennas, $G_k$, $F_k$ being a submatrix of the calibration matrix F corresponding to the k-th group of antennas, $G_k$.

The received signals $Y_{k'ki's}$ with $l=1, \ldots, S_k$ and $Y_{kk'i's'}$ with $l=1, \ldots, S_{k'}$ can be obtained by coherent measurements, i.e. by sending (and receiving) pilots within a short time interval; that is, a time interval sufficiently short for variations of the channel matrix H to be negligible.

In one embodiment, calibrating the antenna array comprises: determining a decalibrated pool of antennas, which is a subset of the antennas of the antenna array; and calibrating the decalibrated pool of antennas. The antenna array can thus be calibrated particularly rapidly.

In one embodiment, determining the decalibrated pool of antennas comprises determining for each $k=1, \ldots, K$ whether group $G_k$ is calibrated, and if the group $G_k$ is found to be calibrated, excluding the antennas of group $G_k$ from the decalibrated pool of antennas. In an initial phase of the calibration procedure, the pool is considered as comprising all antennas of the antenna array. A group $G_k$ of antennas is said to be calibrated if the calibration matrix $F_k$ is known to a sufficient degree of accuracy.

In one embodiment, determining whether group $G_k$ is calibrated comprises applying a method as described herein for the entire antenna array to the group $G_k$, considering the group $G_k$ as the antenna array. In other words, the methods described herein for the "antenna array" can also be applied to the antenna array consisting of the group $G_k$.

The decalibrated pool of antennas can be calibrated by applying a method as described above with respect to the entire antenna array to the decalibrated pool of antennas, considering the decalibrated pool of antennas as the antenna array.

In one embodiment, if the group $G_k$ is found to be decalibrated, the group $G_k$ is partitioned into two or more subgroups and calibration of each of the subgroups is evaluated. The antennas of any of the subgroups that are found to be calibrated are then excluded from the decalibrated pool of antennas.

The method may comprise evaluating calibration (e.g., in a normal mode) of the antenna array based on a plurality of the received signals $Y_{kk'i's}$, wherein $k=1, \ldots, K$, $s=1, \ldots, S_k$, $k' \neq k$, and $i'=1, \ldots, N_{k'}$, and, if the antenna array is found to be decalibrated, calibrating the antenna array (e.g., in an urgent mode) using a method as described above.

In one embodiment, K=2. In other words, the antenna array is partitioned into precisely two groups, $G_1$ and $G_2$. Such a scheme is easy to implement and can be particularly fast.

The method may further comprise computing downlink channel state information on the basis of an uplink channel matrix $H_{UL}$ and the calibration matrix F (e.g., by computing the product $H_{UL}{}^T F^{-T}$.

According to a third aspect, embodiments relate to a computer program comprising a program code for performing the method according to the second aspect or any of its implementation forms when executed on a computer. Thus, the method can be performed in an automatic and repeatable manner.

The computer program can be executed by the base station. The apparatus can be programmably arranged to perform the computer program.

Embodiments of the invention can be implemented in hardware, software, or in any combination of hardware and software.

BRIEF DESCRIPTION OF THE DRAWINGS

These and further embodiments of the invention will be described with respect to the following figures, in which.

Identical reference signs are used for identical or functionally equivalent features.

DETAILED DESCRIPTION OF ILLUSTRATIVE EMBODIMENTS

The invention involves several interrelated concepts that will be described in greater detail hereafter. The concepts may be implemented separately or in combination. The operations described herein can be implemented, for example, by suitably configuring (e.g., programming) the control unit of the MIMO transceiver so that the MIMO transceiver will carry out the respective operations.

Figure 1:
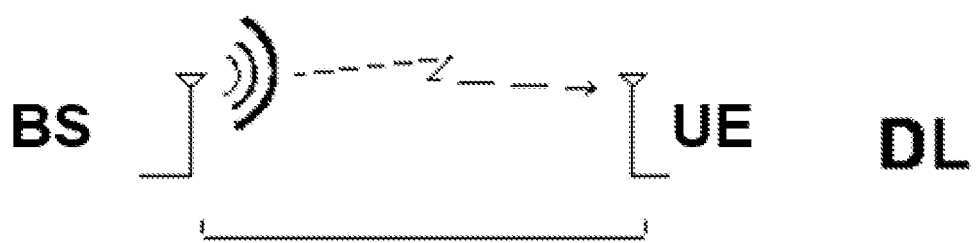
FIG. 1 schematically shows an example of a first MIMO transceiver in communication with a second MIMO transceiver.
Figure 1:
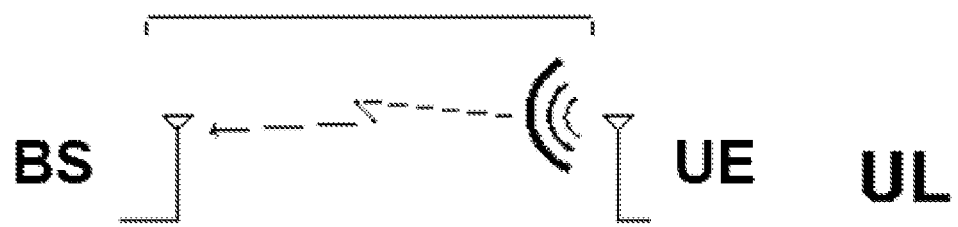
Figure 2:
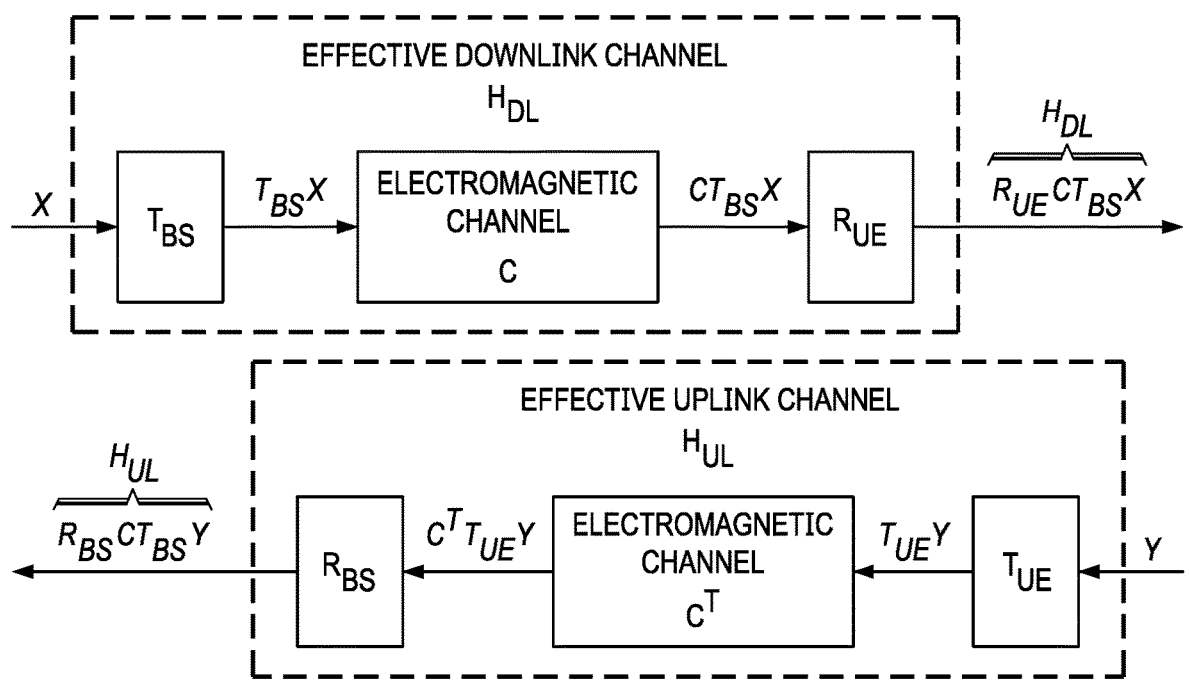
FIG. 2 schematically represents an effective downlink channel and an effective uplink channel.
Figure 3:
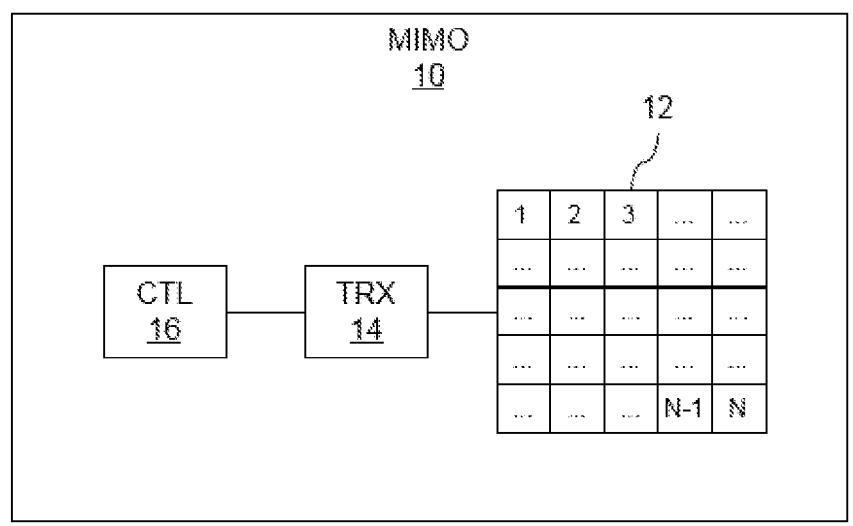
FIG. 3 schematically shows an example of a MIMO transceiver.

FIG. 3 shows an example of a MIMO transceiver 10. The MIMO transceiver 10 comprises an antenna array 12, a transceiver unit 14 connected to the antenna array 12, and a control unit 16 connected to the transceiver unit 14. The antenna array 12 comprises N transceive antennas (numbered 1 to N in the figure). Each of these antennas is operable in a receive (or "listening") mode and in a transmit (or "sending") mode. In the receive mode, the respective antenna is not driven by the transceiver unit 14 and instead generates a received signal in response to electromagnetic radiation from its environment. The received signal is fed to the transceiver unit 14 for further processing. In the transmit mode, the respective antenna is driven by the transceiver unit 14 to emit electromagnetic signals into its environment. The emitted electromagnetic signals can notably comprise downlink signals destined, for example, for one or more user equipments (not shown in this figure), and pilot signals for calibration purposes. In an intra-array calibration scheme, the pilot signals from one transmitting antenna are received by one or more listening antennas of the antenna array 12.

A first concept involves partitioning the antenna area into two or more groups of antennas and transmitting pilot signals among these groups, to generate received pilot signals. The received pilot signals can be used, for example, to determine whether a current calibration matrix $F_{BS}$ is accurate, or for estimating the calibration matrix.

More specifically, the antenna array is partitioned into K groups of antennas, wherein K≥2. It is expected that the technique will be particularly efficient if K is considerably smaller than the total number of antennas and if the various groups have approximately the same size (i.e. if each of the groups $A_k$ comprises about the same number of antennas as the other groups). K=2 may be a particularly good choice.

Figure 4:
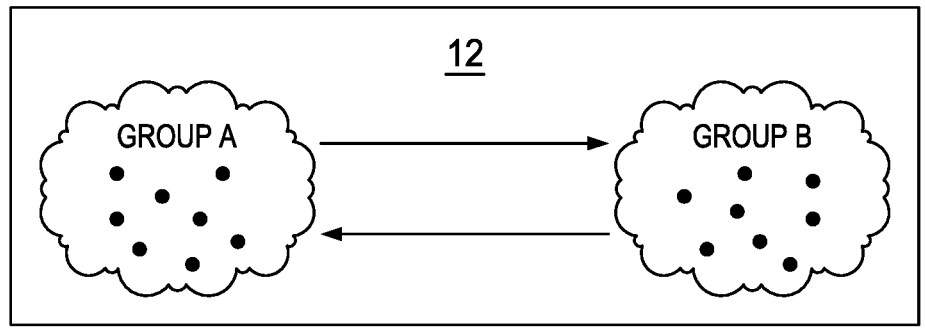
FIG. 4 schematically represents a first example of an intra-array pilot measurement scheme.
Figure 5:
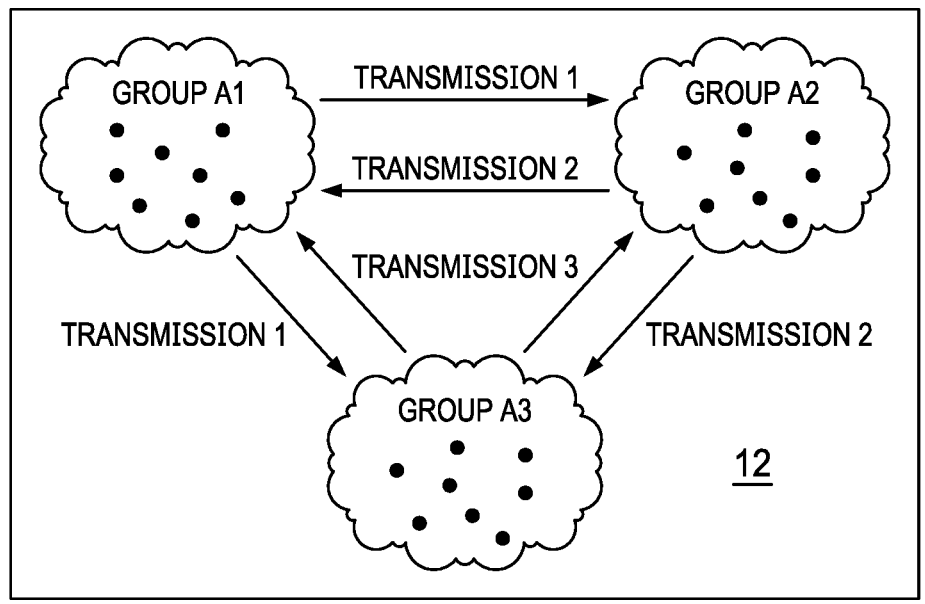
FIG. 5 schematically represents a second example of an intra-array pilot measurement scheme.

The groups are denoted $A_1, \ldots, A_K$. Pilot transmissions between the K groups (see FIG. 4 for K=2 and FIG. 5 for K=3) are performed in K successive intervals. In a k-th interval (where $k=1, \ldots, K$), each antenna of group $A_k$ sends a pilot while the antennas of the other groups are listening (the other groups are $A_1$ to $A_K$ except $A_k$. "Listening" means that they are operated to receive the pilots from group $A_1$). Each of the antennas of group $A_1$ sends its own distinctive pilot. In other words, the pilots sent by different antennas of the group differ from each other (e.g., their carrier waves are identical but they are modulated differently). Each antenna can thus be identified on the basis of its pilot signal. The antennas of group $A_k$ can send their pilots simultaneously, thereby achieving good time efficiency. These operations may be performed repeatedly. E.g., after the K-th interval, the operations of intervals 1 to K may be repeated.

The received pilot signals are used to assess an existing value of the calibration matrix of the antenna array (e.g., to find out whether the antenna array is sufficiently well calibrated), or to determine a new value of the calibration matrix of the antenna array (i.e. to re-calibrate the antenna array).

Referring back to FIG. 3, the control unit 16 may be configured to perform intra-array pilot measurements by the following operations: Partitioning the antenna array into K groups of antennas, $G_k$, k=1, ..., K, wherein K≥2, each group $G_k$ comprising $N_k$ antennas, $A_{ki}$, i=1, ..., $N_k$, of the antenna array. In other words, K mutually exclusive antenna sets (the groups of antennas) are defined, and each of the N antennas of the array is assigned to precisely one of these sets. For each k=1, ..., K, controlling the transceiver unit to perform $S_k$ pilot measurements, $M_{ks}$, s=1, ..., $S_k$, wherein $S_k$≥1. Each pilot measurement $M_{ks}$ comprises transmitting simultaneously by each antenna $A_{ki}$, i=1, ..., $N_k$, of the group $G_k$ a pilot signal $P_{kis}$. Each antenna will transmit its own distinctive pilot signal, thus allowing the respective antenna to be identified on the basis of its pilot signal. The respective pilot measurement $M_{ks}$ further comprises generating by each antenna $A_{k'i'}$, i'=1, ..., $N_{k'}$, of the other groups, $G_{k'}$, k'≠k, a received signal $Y_{kk'i's}$ by receiving the pilot signals $P_{kis}$ transmitted by the antennas $A_{ki}$, i=1, ..., $N_k$.

Note that multiple such pilot transmissions may be needed for calibrating. In particular, K pilot measurements can be sufficient for testing the calibration parameters but not sufficient for updating them. For example, each group $G_k$ can send multiple pilot signals.

A further concept involves an intra-array pilot transmission scheme for rapidly re-calibrating the antenna array when necessary. The scheme comprises two intra-array pilot transmission schemes of the antenna array, namely a detection mode (referred to herein as the normal mode) and a calibration mode (referred to herein as the urgent mode).

In the normal mode, pilot signals are transmitted between antennas of the antenna array and a mismatch between the current value of the calibration matrix $F_{BS}$ and received pilots is estimated. If the estimated mismatch exceeds a threshold value, the MIMO transceiver is switched to urgent mode.

In the urgent mode, pilot signals are transmitted between antennas of the antenna array. After a sufficient number of pilot signals have been transmitted, the MIMO transceiver estimates a new value of the calibration matrix $F_{BS}$ based on the received pilots. In both modes (normal and urgent), the pilots can be transmitted between K antenna groups.

Note that a new value of the calibration matrix can also be estimated after a sufficient number of pilot signal have been transmitted in the normal mode. However, the urgent mode allows estimating a new value of the calibration matrix more rapidly than the normal mode.

Figure 6:
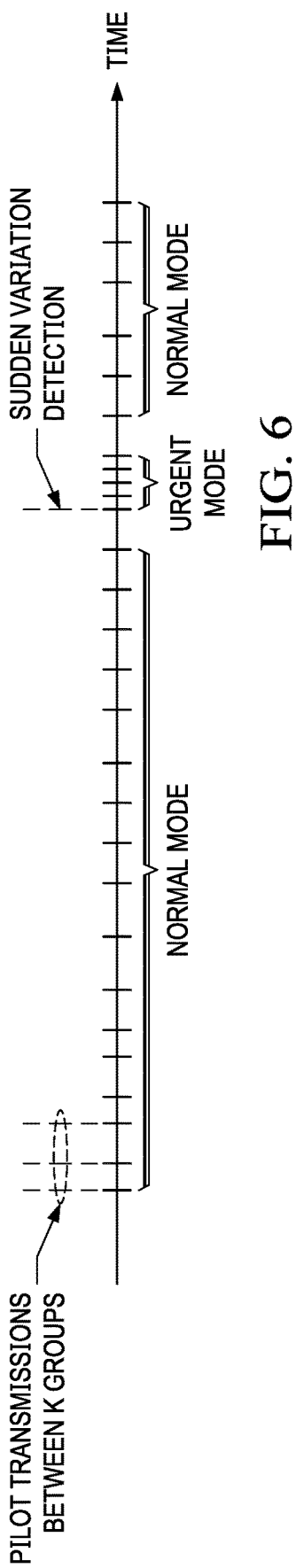
FIG. 6 schematically represents an example of a method of detecting decalibration of an antenna array ("normal mode") and calibrating the antenna array ("urgent mode").

FIG. 6 schematically represents an example of a scenario in which a MIMO transceiver is operating in normal mode, then switches to urgent mode, and then switches back to normal mode.

Figure 7:
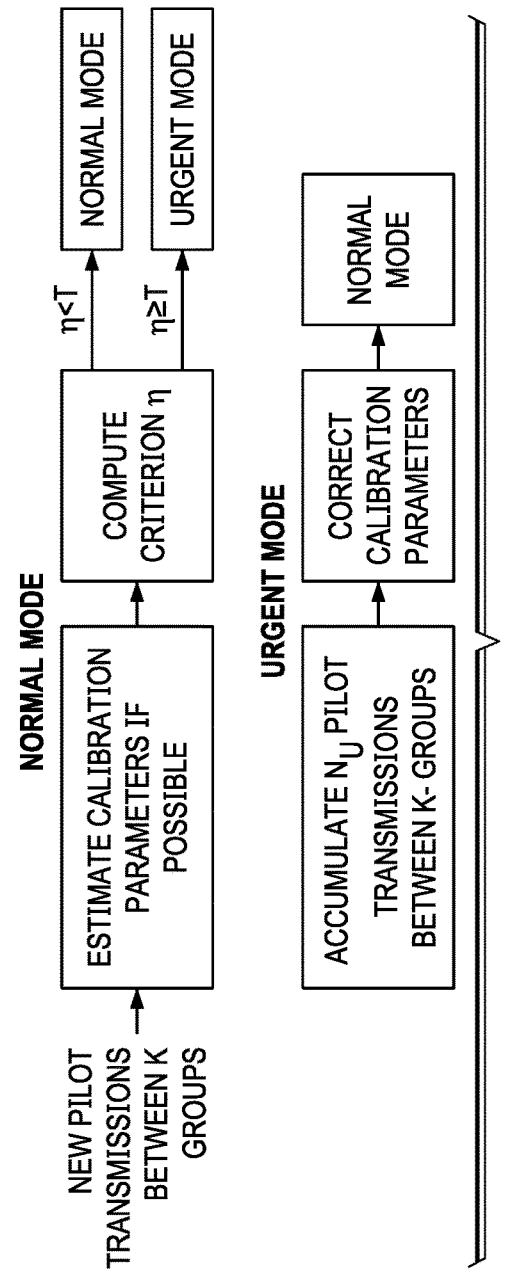
FIG. 7 schematically represents an example of a method of detecting decalibration of an antenna array ("normal mode") and calibrating the antenna array ("urgent mode").

In an embodiment of the normal mode (see FIG. 7, "Normal mode"), group pilot transmissions are performed in successive time slots. In each time slot, a mismatch of the current calibration matrix $F_{BS}$ is estimated based on the received pilot signals. If the estimated mismatch is too high, the MIMO transceiver switches to urgent mode. The normal mode allows detecting any de-calibration (i.e. detecting any mismatch of the current value of the calibration matrix) rapidly and in a spectrally efficient manner, requiring relatively few pilot signal transmissions (that is, requiring less pilot signals transmissions than are required for determining a new value of the calibration matrix). However, the normal mode will in general not be suitable for identifying any de-calibrated antennas.

In an embodiment of the urgent mode (see FIG. 7, "Urgent mode"), a dedicated sequence of pilot signals is sent. A new value of the calibration matrix $F_{BS}$ is determined on the basis of $N_U$ received pilot signals. The number $N_U$ can be chosen sufficiently large so that the decalibrated antenna(s) can be identified. After $N_U$ pilot measurements, the MIMO transceiver is reset to normal mode. The urgent mode allows to identify any de-calibrated antennas, and to re-calibrate them.

In normal mode, pilots are transmitted between K subgroups of antennas A1, ..., AK in a succession of time slots.

Figure 8:
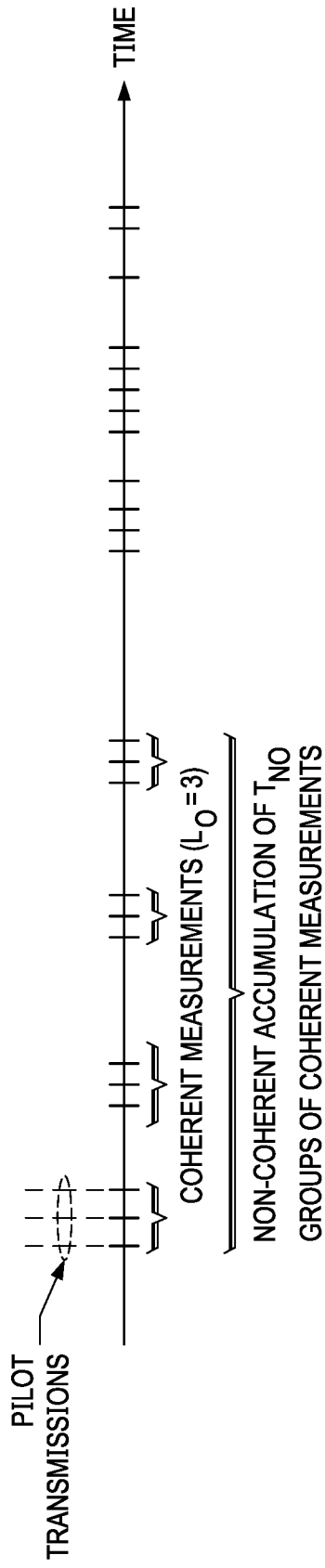
FIG. 8 schematically represents an example of a method of detecting decalibration of an antenna array ("normal mode").

Each time slot can be chosen sufficiently short so that any variation of the channel matrix during the time slot is likely to be negligible. Pilot measurements performed during any one of these time slots are called coherent measurements. Each time slot in the normal mode comprises $L_C$ coherent consecutive bidirectional pilot measurements (e.g., as shown in FIG. 8).

A time slot in which one or more pilots are transmitted may be referred to as a pilot transmission slot. In the period between any two successive pilot transmission slots, the antenna array can be operated to transmit or receive any kind of signal, e.g., to transmit a downlink signal, or to receive an uplink signal. Pilot transmission slots that are separated by one or more time slots are referred to herein as non-coherent time slots. Thus, the $S_k$ pilot measurements mentioned above may be decomposed into $T_{NC}$ groups of $L_C$ coherent measurements. If possible, the calibration matrix is estimated.

The calibration matrix (or submatrices of it) can be estimated, for example, as follows.

The K antenna groups of the antenna array are operated successively to send pilots corresponding to K pilot matrices $P_{1,t}$, ..., $P_{K,t}$: of size $N_1 x L_C ... N_K x L_C$ respectively, for each non coherent slot t (between 1 and $T_{NC}$, where $T_{NC}$ is the number of non-coherent slots). For each k and each coherent slot L (between 1 and $L_C$), the L-th column corresponds to the signals sent by the antenna elements of group $A_k$ respectively. While one of the K antenna groups is sending, the other antennas of the array are listening (i.e., are operated in a receive mode), thus yielding received pilot signals $Y_{1k',t}$, ..., $Y_{K',t}$ which are K matrices of size $N_{k'} x L_C$ respectively containing received signals by sets of antenna elements $A_{k'}$ during the pilot transmissions for each non-coherent slot t (between 1 and $T_{NC}$).

The calibration submatrices $F_1$, ..., $F_K$ are computed based on the received pilot signals. The full calibration matrix F is then the block-diagonal matrix having the submatrices $F_1$, ..., $F_K$, as its block diagonal, i.e.:

$$F = \begin{pmatrix} F_1 & 0 & 0 \\ 0 & \ddots & 0 \\ 0 & 0 & F_K \end{pmatrix}.$$

For any k and k' from 1 to K, k≠k', the transmitted and received pilots are related theoretically by the following reciprocity relation:

$$P_{k,t}^T F_k^{-1} Y_{k'k,t} = Y_{kk',t}^T F_{k'}^{-T} P_{k',t} + n,$$

where n is a noise matrix. This relation can be used to estimate the calibration submatrices $F_1, \ldots, F_K$ based on the transmitted pilots $P_k$ and the received pilots $Y_{kk'}$.

In one embodiment the calibration submatrices $F_1, \ldots, F_K$ are estimated (e.g., by the control unit of the MIMO transceiver) by solving the solution of the following least square minimization problem:

$$\hat{F} = \arg\min_{F_1,\ldots,F_K,\|F^{-1}\|_F^2 = N} \sum_{t=1}^{T_{NC}} \sum_{1 \le k \ne k' \le K} \|P_{k,t}^T F_k^{-1} Y_{k'k,t} - Y_{kk',t}^T F_{k'}^{-T} P_{k',t}\|_F^2.$$

In a variant of this embodiment:

$$\hat{F} = \arg\min_{F_1,\ldots,F_K,F_1=1} \sum_{t=1}^{T_{NC}} \sum_{1 \le k \ne k' \le K} \|P_{k,t}^T F_k^{-1} Y_{k'k,t} - Y_{kk',t}^T F_{k'}^{-T} P_{k',t}\|_F^2.$$

In one embodiment, the pilot matrices of group $A_k$ are designed as follows. Each element at row i and column j of $P_{k,t}$ is randomly chosen such that its norm matches a power constraint α, e.g., $(\alpha e^{i\theta}_{i,j})_{1 \le i \le N_k, 1 \le j \le L_C}$ where $\theta_{i,j}$ s a uniform random variable in the range $[0; 2\pi]$.

In another embodiment, the power of each line of $P_k$, t is chosen to be $$P_k = \frac{\alpha}{(SNR_k)^{1/2}}$$

where $SNR_k$ is the signal-to-noise ratio of the channel between antenna i of subset Ak and the antennas outside the subset Ak. The phase of each element of $P_{k,t}$ is chosen as in the first embodiment, i.e. uniformly random between θ and 2π.

A criterion for detecting decalibration can be computed, for example, as follows. In one embodiment, a criterion $\eta_t$ is computed after each non-coherent time slot t. The criterion $\eta_t$ may be computed as:

$$\eta_t = \sum_{1 \le k \ne k' \le K} \|P_{k,t}^T F_k^{-1} Y_{k'k,t} - Y_{kk',t}^T F_{k'}^{-T} P_{k',t}\|_F^2.$$

If the criterion is found to exceed a defined threshold T, (i.e. when ηt>T), urgent mode is triggered. The threshold T may be chosen, for example, by fixing a probability of wrongly switching to urgent mode to a certain value.

In a first embodiment ("maximum coherent time") of the urgent mode, $N_U = L_C = \sqrt{N}$ coherent consecutive pilots are transmitted similarly as in the normal mode. In this case, the calibration parameters can be estimated through the same equations as in the normal mode. After estimating the calibration parameters, the system returns to normal mode. This technique can be particularly suitable for cases where the channel remains constant over the $N_U$ measurements.

Figure 9:
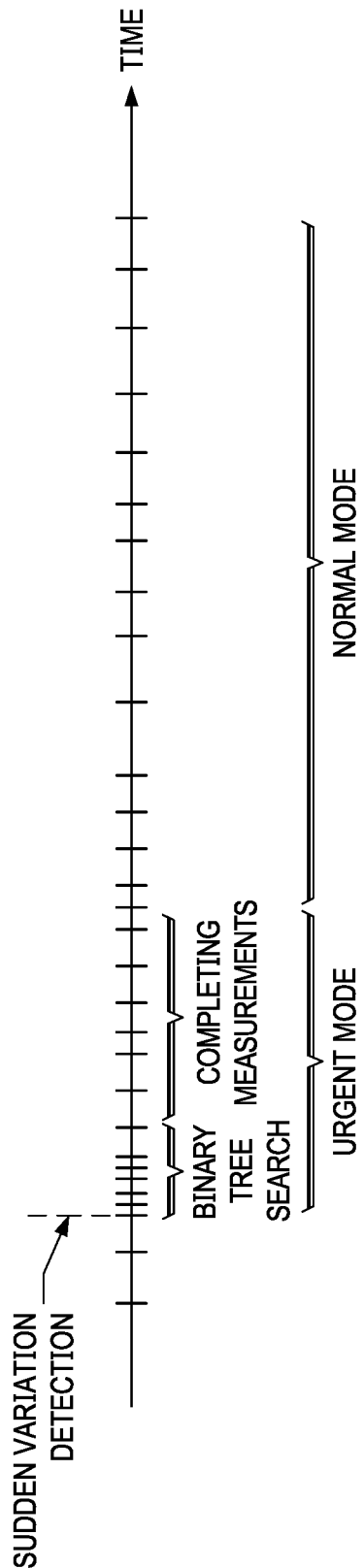
FIG. 9 schematically represents an example of a method of detecting decalibration of an antenna array ("normal mode") and calibrating the antenna array ("urgent mode").

In a second embodiment ("binary tree search", see FIG. 9) of the urgent mode, the urgent mode comprises a tree search operation (e.g., a binary tree search) for determining a pool of decalibrated antennas, followed by a calibration operation for calibrating the pool of decalibrated antennas.

In other words, the tree search serves to identify non-calibrated antennas. The tree search may comprise, for example, N-No further pilot transmissions exchanged between K subgroups of antennas $A_1, \ldots, A_K$ and B. If possible, calibration parameters are estimated after each pilot transmission (e.g., like in normal mode). The system then returns to normal mode, e.g., after a total of $N_U = N$ bi-directional measurements (see FIG. 8).

Figure 10:
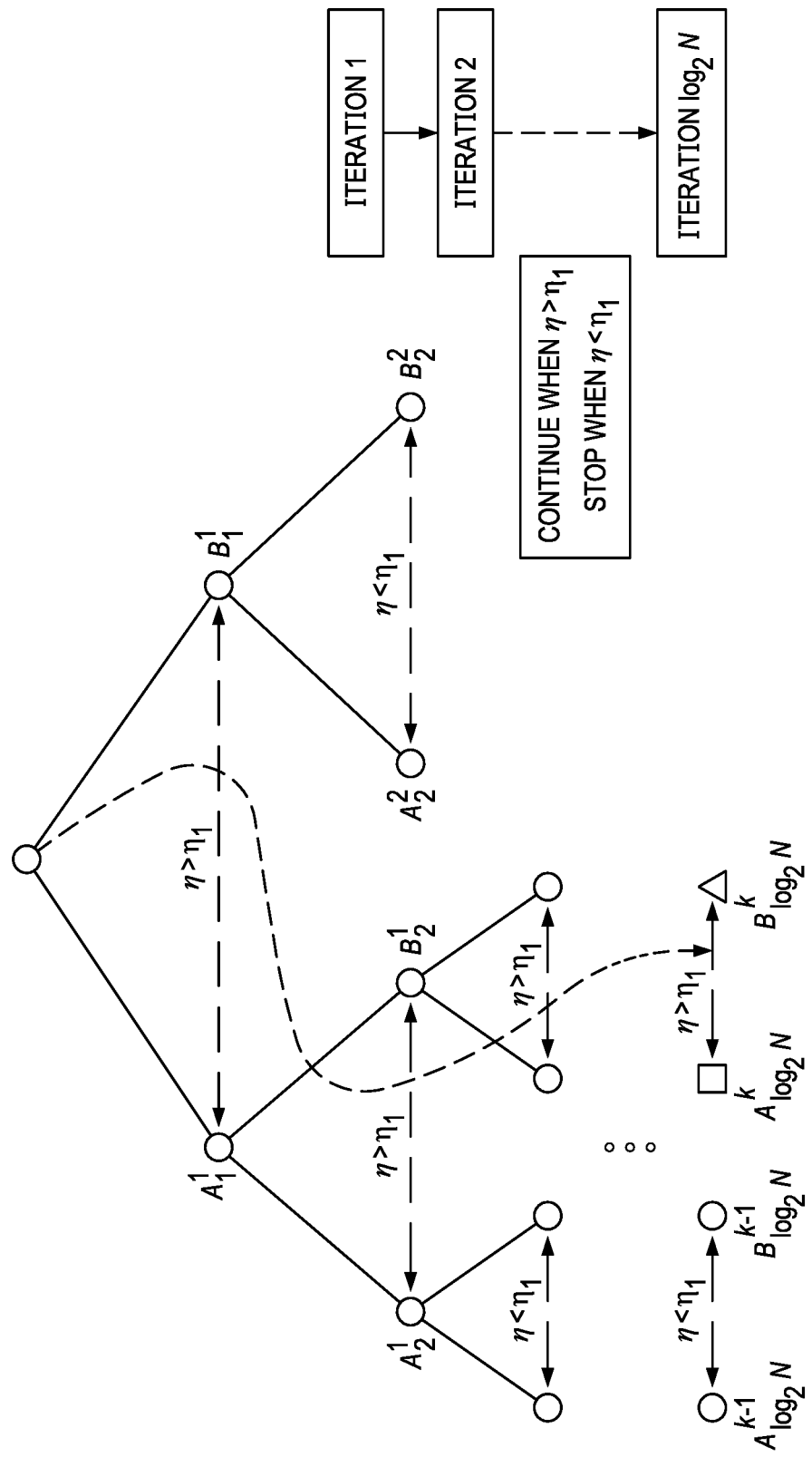
FIG. 10 schematically represents an example of a method for detecting decalibrated antennas.

FIG. 10 shows an example of an embodiment of the tree search. Here, η1 is a threshold which may be optimized offline. In this example, the tree search comprises the following operations (which may be controlled by a control unit of the MIMO transceiver):

Pilots are exchanged between K subgroups of antennas $A_1, \ldots, A_K$. A criterion $$\eta = \sum_{1 \le k \ne k' \le K} \|P_k^T F_k^{-1} Y_{k'k} - Y_{kk'}^T F_{k'}^{-T} P_{k'}\|_F^2$$

(with notations as detailed above for the normal mode) is computed based on the received pilots.

$\eta < \eta_{max}$ the binary tree search is stopped; otherwise, for each group $A_k$ (k=i, …,K) a second criterion $\gamma_k$ is computed as $$\gamma_k = \max_{k' \ne k} \|P_k^T F_k^{-1} Y_{k'k} - Y_{kk'}^T F_{k'}^{-T} P_{k'}\|_F^2.$$

If $y_k > \gamma_{max}$, Group $A_k$ is partitioned into K subgroups $A_k A_1, A_k A_2, \ldots, A_k A_K$. Note that if $\gamma_{max} = 0$, the second criterions $\gamma_k$ do not need to be computed). Pilots are then exchanged between these K subgroups and a corresponding criterion $\eta_{Ak}$ is computed. If $\eta_{Ak} < \eta_{max}$, groups $A^1 A_1, \ldots, A_K$ are not partitioned any further. Otherwise, (i.e. if $\eta_{A1} > \eta_1$), second criteria $\eta_{Ak,k'}$ are computed. If $\gamma_{Ak,k} > \gamma_{max}$, the group $A_k A^{k'}$ will also be divided into K subgroups.

This process is iterated until each remaining group contains only one element.

Multiple pilots are then transmitted between only the remaining antennas of the array, i.e. between the antennas of the decalibrated pool of antennas, (e.g., by a transmission scheme as in the normal mode), and calibration parameters for those remaining antennas are determined based on the received pilots.

The above described techniques have the following advantages. The coherent and non-coherent accumulation of pilot transmissions between two subgroups of antenna allows the calibration technique to be spectrally efficient. Note that it will require comparatively few pilot symbols (if $L_C = \sqrt{N}$, only $\sqrt{N}$ pilot transmissions are needed. The calibration technique can also be quite robust with respect to hardware behavior, by allowing detecting and correcting sudden variations of calibration parameters.

Estimating a quantity means determining a value of the quantity. If the quantity comprises multiple elements (e.g., if the quantity is a tuple or a matrix), the value also comprises multiple elements; estimating the quantity then means determining a value of each of the multiple elements.

A pilot transmission from one group of antennas (first group) to another group of antennas (second group) means the operations of transmitting simultaneously from each antenna of the first group a pilot and receiving that pilot by each antenna of the second group. This is called a uni-directional pilot transmission.

A bi-directional pilot transmission between one group of antennas (first group) and another group of antennas (second group) is a uni-directional pilot transmission from the first group to the second group, followed by a uni-directional pilot transmission in the opposite sense, that is, from the second group to the first group.

Calibrating a group of antennas of an antenna array means determining a calibration matrix associated with the group of antennas. The calibration matrix associated with the group of antennas is a submatrix of a calibration matrix associated with the whole antenna array.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A multiple input multiple output (MIMO) transceiver, comprising:
    an antenna array;
    a transceiver connected to the antenna array; and
    a controller connected to the transceiver;
    wherein the antenna array comprises N transceive antennas;
    wherein the controller is configured to perform intra-array pilot measurements by:
        partitioning the antenna array into K groups of antennas $G_k$, wherein k=1, ..., K, K≥2, each group $G_k$ of antennas comprises $N_k$ antennas $A_{ki}$, and i=1, ..., $N_k$; and
        for each group of antennas $G_k$ from k=1 to k=K, controlling the transceiver to perform $S_k$ pilot measurements $M_{ks}$, wherein s=1, ..., $S_k$, $S_k \geq 1$, and wherein each pilot measurement $M_{ks}$ corresponding to a respective group of antennas $G_k$ is performed by transmitting simultaneously, by each antenna of the respective group of antennas $G_k$, a respective pilot signal $P_{kis}$, and generating, by each antenna $A_{k'i'}$ of the other groups of antennas $G_{k'}$, a received signal $Y_{kk'i's}$ by receiving the pilot signals $P_{kis}$ transmitted by the antennas $A_{ki}$ of the respective group of antennas $G_k$, wherein k'≠k, and, i'=1, ..., $N_{k'}$; and
    wherein the controller is further configured to:
        evaluate calibration of the antenna array by computing, using a plurality of the received signals $Y_{kk'i's}$, an extent to which a set of reciprocity relations is violated, to determine a mismatch of a current calibration matrix, wherein each of the reciprocity relations of the set of reciprocity relations is between received signals generated by one of the groups of antennas and received signals generated by another one of the groups of antenna;
        in response to determining that the mismatch of the current calibration matrix exceeds a threshold value, performing calibration of the antenna array; and
        in response to determining that the mismatch of the current calibration matrix is below the threshold value, skipping calibration of the antenna array.

2. The MIMO transceiver of claim 1, wherein at least one of the K groups of antennas $G_k$ comprises two or more antennas.

3. The MIMO transceiver of claim 1, wherein the controller is configured to:
    calibrate the antenna array by determining an updated calibration matrix F of size N×N, to minimize or reduce an extent to which the set of reciprocity relations is violated.

4. The MIMO transceiver of claim 3, wherein the reciprocity relations satisfy the following relation:

$$\Sigma_{i=1}^{N_k} \Sigma_{i'=1}^{N_k} P_{kis} (F_k^{-1})_{ii'} Y_{kk'i's} = \Sigma_{i=1}^{N_k} \Sigma_{i'=1}^{N_{k'}} Y_{k'ki's} (F_{k'}^{-1})_{ii'} P_{k'is'}$$

wherein $F_k$ is a calibration matrix of size $N_k \times N_k$ for the k-th group of antennas $G_k$, and wherein $F_k$ is a submatrix of the updated calibration matrix F associated with the k-th group of antennas $G_k$.

5. The MIMO transceiver of claim 4, wherein the measurements $S_k$ pilot measurements $M_{ks}$ with s=1, ..., $S_k$ and $Y_{kk'i's'}$ with s'=1, ..., $S_{k'}$ are coherent measurements.

6. The MIMO transceiver of claim 5, wherein the controller is configured to calibrate the antenna array by:
    determining, for each of k=1 to k=K, whether a respective group $G_k$ is calibrated, to obtain a calibration result for the respective group $G_k$;
    determining a decalibrated pool of antennas, wherein the decalibrated pool of antennas comprises each group $G_k$ with a corresponding calibration result indicating that the respective group $G_k$ is decalibrated; and
    calibrating the decalibrated pool of antennas.

7. The MIMO transceiver of claim 6, wherein the controller is configured to:
    in response to the respective group $G_k$ being found to be decalibrated, to partition the respective group $G_k$ into two or more subgroups and to evaluate calibration of each of the subgroups and, for any one of the subgroups that is found to be calibrated, exclude the antennas of that subgroup from the decalibrated pool of antennas.

8. The MIMO transceiver of claim 7, wherein K=2.

9. The MIMO transceiver of claim 8, wherein the controller is configured to:
    compute downlink channel state information on the basis of an uplink channel matrix $H_{UL}$ and the updated calibration matrix F.

10. A method, comprising:
    partitioning an antenna array comprising N transceive antennas into K groups of antennas, $G_k$, wherein k=1, K, K≥2, each group $G_k$ of antennas comprises $N_k$ antennas, $A_{ki}$, and i=1, ..., $N_k$;

for each group of antennas $G_k$ from k=1 to k=K, performing $S_k$ pilot measurements $M_{ks}$, wherein s=1, ..., $S_k$, $S_k$≥1, and wherein each pilot measurement $M_{ks}$ corresponding to a respective group of antennas $G_k$ is performed by transmitting simultaneously, by each antenna $A_{ki}$ of the respective group of antennas $G_k$, a pilot signal $P_{kis}$, and generating, by each antenna $A_{k'i'}$ of the other groups of antennas $G_{k'}$, a received signal $Y_{kk'i's}$ by receiving the pilot signals $P_{kis}$ transmitted by the antennas $A_{ki}$ of the respective group of antennas $G_k$, wherein i'=1, ..., $N_{k'}$ and k'≠k;

determining a decalibrated pool of antennas by:
- determining, for each of k=1 to k=K, whether a respective group $G_k$ is calibrated;
- in response to the respective group $G_k$ being determined to be calibrated, excluding the respective group $G_k$ from the decalibrated pool of antennas;
- in response to the respective group $G_k$ being found to be decalibrated, partitioning the respective group $G_k$ into two or more subgroups, evaluating calibration of each of the subgroups, for any one of the subgroups that is found to be calibrated, excluding the antennas of that subgroup from the decalibrated pool of antennas, and for any one of the sub groups that is found to be decalibrated, including the antennas of that subgroup in the decalibrated pool of antennas; and
- calibrating antennas of the decalibrated pool of antennas.

11. The method of claim 10, wherein at least one of the K groups of antennas comprises two or more antennas.

12. The method of claim 11, further comprising:
evaluating calibration of the antenna array, wherein the evaluation of the calibration of the antenna array, or the calibration of the antenna array, is based on a plurality of the received signals $Y_{kk'i's}$.

13. The method of claim 12, wherein:
evaluating the calibration of the antenna array comprises computing an extent to which a set of reciprocity relations is violated;
wherein each of the reciprocity relations of the set of reciprocity relations is between received signals generated by one of the groups of antennas and received signals generated by another one of the groups of antennas.

14. The method of claim 13, wherein the reciprocity relations satisfy the following relation:

$$\sum_{i=1}^{N_k}\sum_{i'=1}^{N_k} P_{kis}(F_k^{-1})_{ii'} Y_{kk'i's} = \sum_{i=1}^{N_k}\sum_{i'=1}^{N_{k'}} Y_{k'ki's}(F_{k'}^{-1})_{ii'} P_{k'is'}$$

wherein $F_k$ is a calibration matrix of size $N_k \times N_k$ for the k-th group of antennas $G_k$, and wherein $F_k$ is a submatrix of the calibration matrix F associated with the k-th group of antennas $G_k$.

15. A computer program product comprising a non-transitory memory storing instructions that are executable by at least one processor, the instructions comprising instructions for:

partitioning an antenna array comprising N transceive antennas into K groups of antennas, $G_k$, wherein k=1, ..., K, K≥2, each group $G_k$ of antennas comprises $N_k$ antennas, $A_{ki}$, and i=1, ..., $N_k$;

for each group of antennas $G_k$ from k=1 to k=K, performing $S_k$ pilot measurements $M_{ks}$, wherein s=1, ..., $S_k$, $S_k$≥1, and wherein each pilot measurement $M_{ks}$ corresponding to a respective group of antennas $G_k$ is performed by transmitting simultaneously, by each antenna $A_{ki}$ of the respective group of antennas $G_k$, a pilot signal $P_{kis}$, and generating, by each antenna $A_{k'i'}$ of the other groups of antennas $G_{k'}$, a received signal $Y_{kk'i's}$ by receiving the pilot signals $P_{kis}$ transmitted by the antennas $A_{ki}$ of the respective group of antennas $G_k$, wherein i'=1, ..., $N_{k'}$ and k'≠k;

determining a decalibrated pool of antennas by:
- determining, for each of k=1 to k=K, whether a respective group $G_k$ is calibrated;
- in response to the respective group $G_k$ being determined to be calibrated, excluding the respective group $G_k$ from the decalibrated pool of antennas;
- in response to the respective group $G_k$ being found to be decalibrated, partitioning the respective group $G_k$ into two or more subgroups, evaluating calibration of each of the subgroups, for any one of the subgroups that is found to be calibrated, excluding the antennas of that subgroup from the decalibrated pool of antennas, and for any one of the sub groups that is found to be decalibrated, including the antennas of that subgroup in the decalibrated pool of antennas; and
- calibrating antennas of the decalibrated pool of antennas.

16. The computer program product of claim 15, wherein at least one of the K groups of antennas comprises two or more antennas.

* * * * *

UNITED STATES PATENT AND TRADEMARK OFFICE
CERTIFICATE OF CORRECTION

PATENT NO. : 10,998,987 B2  
APPLICATION NO. : 16/571967  
DATED : May 4, 2021  
INVENTOR(S) : Alexis Decurninge Page 1 of 1

It is certified that error appears in the above-identified patent and that said Letters Patent is hereby corrected as shown below:

In the Claims

In Claim 4, Column 14; Lines 30-34 after the formula $\Sigma_{i=1}^{N_k} \Sigma_{i'=1}^{N_k} P_{kis}(F_k^{-1})_{ii'} Y_{kk'i's'} = \Sigma_{i=1}^{N_{k'}} \Sigma_{i'=1}^{N_{k'}} Y_{k'ki's}(F_{k'}^{-1})_{ii'} P_{k'is'}$ insert --; and--

In Claim 5, Column 14; Lines 38 and 39 delete "wherein the measurements $S_k$" insert --wherein the $S_k$--

In Claim 10, Column 14; Line 67 and Column 15; Line 1 delete "k=1, K, K ≥ 2 ," insert --k=1,...,K, K ≥ 2,--

In Claim 14, Column 16; Line 3 after the formula $\Sigma_{i=1}^{N_k} \Sigma_{i'=1}^{N_k} P_{kis}(F_k^{-1})_{ii'} Y_{kk'i's'} = \Sigma_{i=1}^{N_{k'}} \Sigma_{i'=1}^{N_{k'}} Y_{k'ki's}(F_{k'}^{-1})_{ii'} P_{k'is'}$ insert --; and--

<div style="text-align:center">

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*

</div>